(12) United States Patent
von Kopylow et al.

(10) Patent No.: US 6,785,307 B2
(45) Date of Patent: Aug. 31, 2004

(54) METHOD AND ARRANGEMENT FOR THE SELF-CALIBRATION OF A DIODE PUMPED SOLID STATE LASER, PARTICULARLY A TUNABLE, DIODE PUMPED SOLID STATE LASER

(75) Inventors: Christoph von Kopylow, Hannover (DE); Guenter Thommes, Bremen (DE); Hermann F. L. Maier, Hamburg (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/834,432

(22) Filed: Apr. 13, 2001

(65) Prior Publication Data

US 2002/0009108 A1 Jan. 24, 2002

(30) Foreign Application Priority Data

Apr. 15, 2000 (DE) .......................................... 100 18 778

(51) Int. Cl.[7] .................................................. H01S 3/10
(52) U.S. Cl. ............................... 372/20; 372/21; 372/22
(58) Field of Search ................................ 372/20, 21, 22

(56) References Cited

U.S. PATENT DOCUMENTS

| | | | | |
|---|---|---|---|---|
| 3,609,586 A | * | 9/1971 | Danielmeyer ................. | 372/20 |
| 4,791,633 A | * | 12/1988 | Esherick et al. ............... | 372/32 |
| 4,932,031 A | * | 6/1990 | Alfano et al. .................. | 372/20 |
| 4,947,398 A | * | 8/1990 | Yasuda et al. ......... | 372/29.021 |
| 4,969,150 A | * | 11/1990 | Esterowitz et al. ............ | 372/20 |
| 5,084,884 A | * | 1/1992 | Terada ............................ | 372/32 |
| 5,130,998 A | * | 7/1992 | Wakata et al. ................. | 372/32 |
| 5,272,708 A | * | 12/1993 | Esterowitz et al. ............ | 372/20 |
| 5,701,320 A | * | 12/1997 | Sugiyama et al. ............. | 372/32 |
| 6,108,355 A | * | 8/2000 | Zorabedian .................... | 372/20 |

* cited by examiner

Primary Examiner—Don Wong
Assistant Examiner—Cornelius H. Jackson
(74) Attorney, Agent, or Firm—Reed Smith LLP

(57) ABSTRACT

A method for the self-calibration of a tunable, diode pumped solid state laser in which the frequency or the wavelength of the laser radiation of the fundamental frequency and/or doubled frequency is changed by of changing the optical cavity length by means of a piezo-actuator or Brewster window over the total amplification bandwidth of the laser-active material. According to the method, the performance curves during the tuning of an etalon or corresponding optical elements arranged in the cavity are recorded and stored and a tuning function for the respective optical element or optical elements is generated (derived) from these curves by a microcontroller or computer. An optimum working point for the optical element or optical elements for maximum suppression of side modes is adjusted by a digital or analog regulator with the help of a learning curve (learning characteristic). In the solid state laser, an etalon is provided inside the cavity for changing (expanding) the tuning range and for determining the output power of the laser, wherein the etalon is rotatable or swivelable about an axis of rotation which extends at right angles to the optical axis of the laser or so as to be inclined relative to the latter by a small angle.

26 Claims, 3 Drawing Sheets

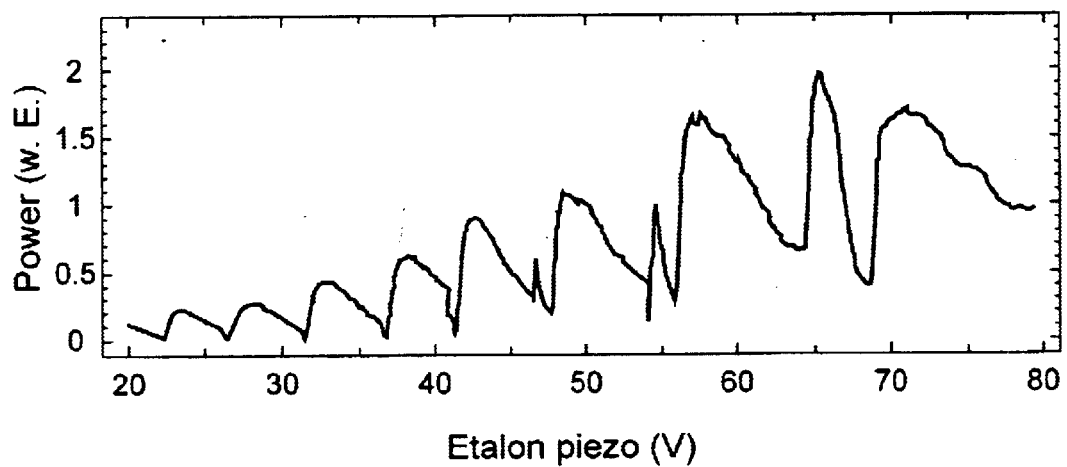
F I G. 6
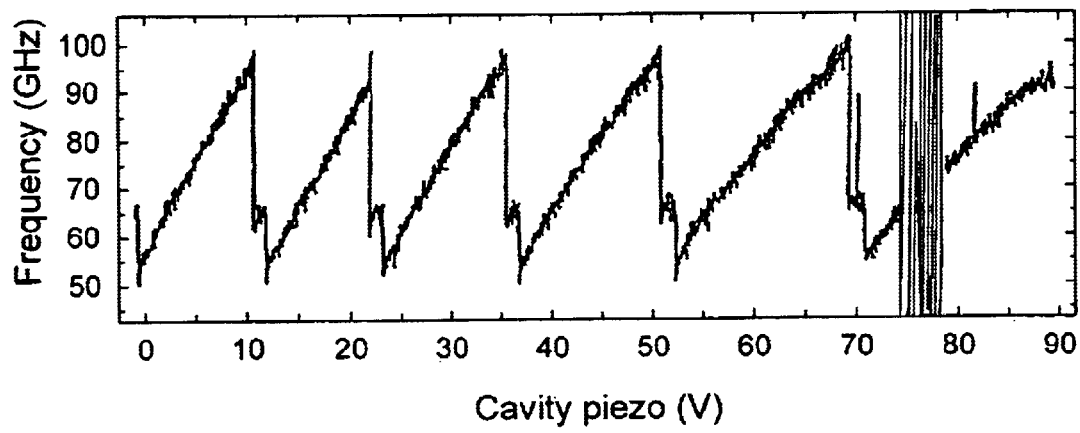
F I G. 7

METHOD AND ARRANGEMENT FOR THE SELF-CALIBRATION OF A DIODE PUMPED SOLID STATE LASER, PARTICULARLY A TUNABLE, DIODE PUMPED SOLID STATE LASER

BACKGROUND OF THE INVENTION a) Field of the Invention

The invention is directed to a method and arrangement for the self-calibration of a diode pumped solid state laser (DPSSL), particularly a tunable, diode pumped solid state laser, in which the cavity length is changed for tuning the frequency of the radiation of the laser.

b) Description of the Related Art

It is known from DE 42 42 862 in a solid state laser pumped by laser diodes that the laser-active medium is contacted by a piezoelectric foil which is contacted in turn by an out-coupling mirror. The length of the air gap between the lasing medium and the out-coupling mirror is adapted. Mode selection is achieved by suitable selection of the reflectivity of the mirror. This air gap has a length such that an optional selection of individual laser transitions, Q-switching or tuning of the laser frequency is made possible when voltage is applied to the piezoelectric foil.

DE 40 41 131 A1 and DE 40 42 440 A1 describe a solid state laser with longitudinal single-mode operation whose laser crystal is optically pumped by laser diodes. A piezo-ceramic provided with a high-voltage generator (HV generator) for matching and modulating the wavelength and the fundamental and frequency-doubled radiation is associated with the doubling crystal. The tuning of the fundamental wavelength and second harmonic of the solid state laser is carried out by means of a variable change in the cavity length via the total amplification bandwidth. Different cavity lengths and a change in the longitudinal modes are achieved by means of a variable positioning of the out-coupling mirror.

The laser and the doubling nonlinear crystal are spatially separated from one another and a piezo-ceramic which is controllable by an HV generator is associated with the nonlinear crystal.

It is known from DE 36 43 648 C2 to provide an etalon in the form of an optical plate of small thickness for suppression of the amplitude noise in the resonator cavity in laser-diode pumped solid state lasers with intra-cavity frequency doubling, wherein the resonator cavity is preferably arranged at the location of a beam waist in order to minimize optical losses as well

OBJECT AND SUMMARY OF THE INVENTION

It is the primary object of the invention to provide a method and an arrangement for calibration in a tunable, diode pumped solid state laser which make it possible to compensate long-duration drift through self-calibration before every scan or as needed and thus, with an expandable tuning range of the laser, to always optimize the output power of the laser.

According to the invention, this object is met in a method for the self-calibration of a tunable, diode pumped solid state laser in which the frequency of the laser radiation of the fundamental frequency and/or the wavelength of the laser radiation of the fundamental frequency and/or doubled frequency is changed comprising the step of changing the optical cavity length by a piezo-actuator or Brewster window over the total amplification bandwidth of the laser-active material and, further including the steps of recording and storing the performance curves during the tuning of an etalon or corresponding optical elements arranged on the cavity, generating or deriving a tuning function for the respective optical element or optical elements from these curves by a microcontroller or computer and adjusting an optimum working point for the optical element or optical elements for maximum suppression of side modes by a digital or analog regulator with the help of a learning curve or learning characteristic.

An arrangement for the self-calibration of the diode-pumped solid state laser which comprises a laser diode as pump light source followed by in-coupling optics, a laser crystal followed by out-coupling optics or a nonlinear, frequency-doubling crystal, wherein the outer surfaces of the laser crystal and doubling crystal or out-coupling mirror have a reflective coating for the laser fundamental frequency and/or for the frequency-doubled radiation and enclose the cavity between them, and further comprises an actuator for varying the cavity length for purposes of tuning the laser is characterized primarily in that an etalon is provided inside the cavity for changing the tuning range and for determining the output power, wherein the etalon is rotatable or swivel-able about an axis of rotation which extends at right angles to the optical axis of the laser or is inclined relative to the latter at a small angle.

In order to achieve a multiplication of the frequency of the radiation of the laser, a plurality of suitable nonlinear crystals can be arranged following the laser crystal.

Further details and developments of the invention are disclosed in the additional, dependent claims.

Accordingly, in order to record a learning curve, it is advantageous to tune the etalon or an optical element with increasing amplitude and to correct the deviation from the optimal position at the edge of the tuning range of another optical element. Accordingly, it can also be advantageous when the movement or adjustment of the etalon is adapted to the change in the length of the cavity.

Further, it is advantageous when optimizing an optical element that the latter is itself modulated or another optical element is modulated.

Accordingly, by means of modulating the optical element, a tuning characteristic of the latter or of another optical element is determined and stored.

Further, it is advantageous when the frequency-selective elements of the laser are adjusted between two mode jumps by means of a microcontroller or computer according to the recorded laser characteristic in such a way that side modes are suppressed to a maximum degree.

It is further advantageous when the learning characteristic is adjusted in that the cavity length determining the frequency is tuned as the "finest" frequency-selective element of the laser with increasing amplitude and the mode jumps occurring at the edge of the tuning range are detected (registered) by a suitable measuring instrument or via the output of the laser. The movement of the next coarsest frequency-selective element at the edge of the tuning range is then changed (adapted) until a frequency jump (in the characteristic) no longer occurs. The entire position (movement) of the coarse element is then stored.

Further, according to the method, the power curve or performance curve of the laser is advantageously recorded with a change of the rotational angle σ of the etalon and constant cavity length and with a change in the cavity length and a stationary etalon.

In the arrangement for the self-calibration of the DPSSL, it is advantageous when the etalon is constructed as a transparent disk which is rotatable or swivelable about the axis of rotation and its angle is adjustable by an angular drive.

A stepper motor, known per se, at least one of whose coils is controllable by means of a controlling circuit, can be provided as a drive device. However, a piezo-actuator in operative connection with the etalon directly or with the intermediary of additional elements can also be provided as drive device, wherein it is advantageous that the piezo-actuator comprises a bending element as driving element.

Further, it may be advantageous that only one coil of the stepper motor is controlled. It can also be advantageous when both coils of the stepper motor are controlled, wherein the field vector is modulated to prevent hystereses. The motor can also advantageously be operated in microstep operation.

It has proven advantageous when the rotational axis or shaft of the etalon is arranged so as to be inclined at an angle δ of less than 10° in relation to the vertical line to the optical axis of the laser.

The cooling of the moving elements is realized advantageously and by simple techniques by means of an element with good heat conductivity, preferably made of copper or another suitable material. In this respect, it is advantageous when an element is provided for this purpose.

In order to prevent formation of parasitic etalons, the crystals and other optical elements arranged in the cavity are advantageously constructed in a wedge-shaped manner.

Further, a standing wave cavity can be provided in such a way that a secure single-frequency operation is achieved by means of suitable matching of the selectivity of the etalon with the suppression of side modes by spatial hole burning achieved by the arrangement and selection of thickness of the laser crystal.

In another advantageous construction, a piezo-actuator with a stationary etalon is provided for tuning the laser, wherein the free spectral range of the etalon is greater than the amplification bandwidth of the laser crystal and the fineness is selected in such a way that a secure single-frequency operation is ensured in the maximum tuning range. It may also be advantageous that the etalon takes part in the movement to achieve a larger tuning range.

The invention will be described more fully with reference to the drawings.

BRIEF DESCRIPTION OF THE DRAWINGS

In the drawings:

FIG. 6 shows a performance curve of a DPSSL; and

FIG. 7 shows a frequency curve.

In the individual Figures, identical reference numbers are used for parts and subassemblies having identical functions.

DESCRIPTION OF THE PREFERRED EMBODIMENTS

Figure 1:
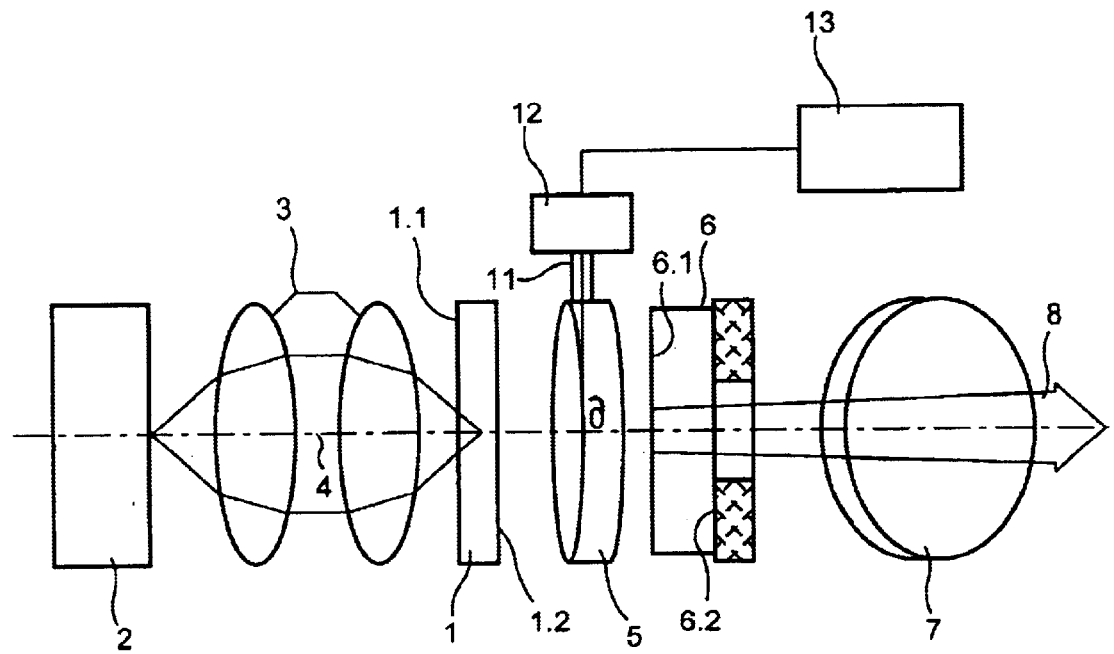
FIG. 1 is a schematic top view showing the construction of the solid state laser with motor-driven etalon.
Figure 2:
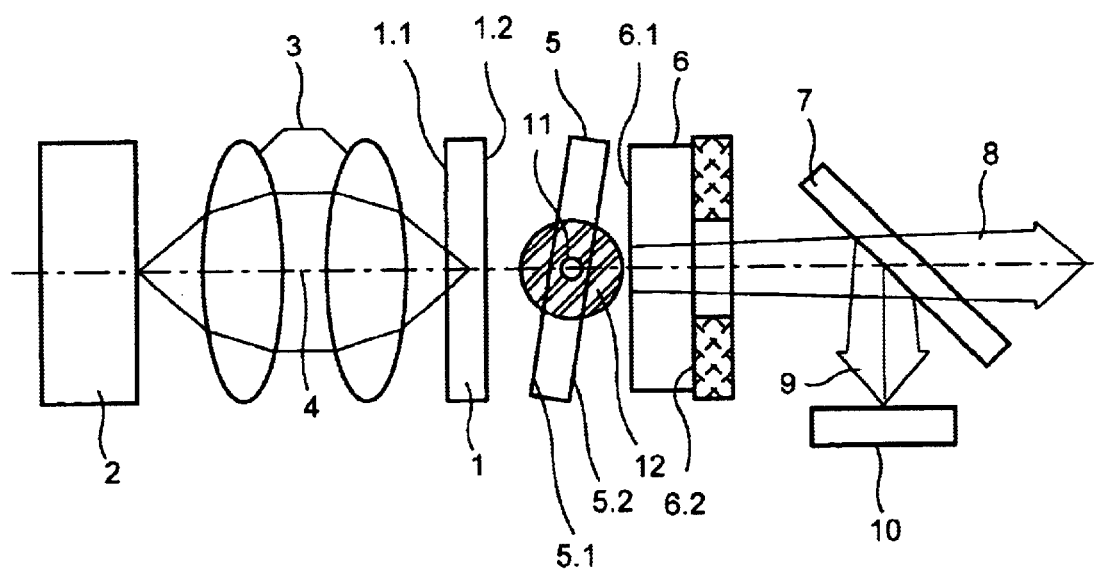
FIG. 2 shows a side view of the solid state laser.

The DPSSL shown schematically in several views in FIGS. 1 and 2 comprises a laser crystal 1 and, as pumped light source, a pump diode 2 or a corresponding arrangement of a plurality of such diodes. The pump radiation emitted by the pump diode 2 is focused on the laser crystal 1 by imaging optics 3 arranged downstream in order to excite the laser crystal 1 for lasing. The laser crystal 1 is followed in the direction of the optical axis 4 of the laser arrangement by, in sequence, an angularly adjustable etalon 5, for example, a transparent, disk-shaped solid state etalon, and a nonlinear crystal 6, for example, KTP, which doubles the frequency of the radiation of the laser crystal 1. This etalon 5 is used for changing, above all, expanding, the tuning range and also for adjusting and determining the output power of the laser crystal 1. The frequency-doubled radiation 8 is coupled out via an out-coupling element 7 which in the present example is a beam splitter element. A beam component 9 (FIG. 2) of the radiation 8 is cut out in a manner known per se by the out-coupling element 7 for measurement purposes and is fed to a measurement element 10 for generating measurement signals.

The etalon 5 is advantageously fixedly arranged on a rotational shaft 11 which is in an operative connection with a drive 12 and can be rotated or swiveled by the latter. For example, a stepper motor, known per se, is provided in FIG. 1 as a drive 12. The rotational shaft 11 extends vertical to the optical axis 4 of the laser arrangement or is inclined relative to the optical axis 4 at a small angle (δ<10°). This prevents the occurrence of cavities coupled in the middle position during rotation of the etalon 5, which could lead to undefined frequency jumps. The drive 12, for example, the coils of a stepper motor, communicates with a control device 13 and is controlled by the latter in a corresponding manner. The tuning range of the laser can be expanded by this rotation of the etalon 5 and its output power can be optimized. The measurement element 10, for example, is provided for measuring this output power.

It is advantageous when the etalon 5 is fastened directly to the shaft (rotational axis 11) of the stepper motor, which provides for a simple construction with additional gear units or intermediate gears and prevents additional hystereses in the course of movements of the etalon 5 as well as other mechanical control problems.

When a stepper motor is used as the drive 12, either only one coil or both coils can be controlled by means of the control device 13. Controlling only one coil simplifies the control of the stepper motor on one hand and, on the other hand, it is possible to remain within the gearing (pitch) of the stepper motor once this has been set; this means that the etalon 5 is always in a virtually correct position and the control need not hunt blindly for a starting position without a regulating signal. In order to achieve the necessary angular resolution in the adjustment of the etalon 5, microstep operation is required in controlling the stepper motor by means of the control device 13, i.e., the rotation of the etalon 5 must be carried out in small steps or the coils must be controlled with an analog signal, which makes it possible to change the etalon angle in a continuous manner.

When both coils of the stepper motor are controlled by corresponding modulation of the field vector, the position of the etalon 5 does not change. In this way, "soft" hystereses can be prevented.

In the other case, the position of the etalon 5 is modulated. This prevents "soft" and "hard" hystereses. The frequency of the laser is not changed in this way.

"Soft" hystereses are, for example, hystereses caused by residual magnetization when an element does not exactly follow a control voltage, but "lags" behind it. "Hard"

hystereses are those occurring, for example, by means of mechanical play between cooperating parts or elements.

Individual elements of the laser arrangement have highly-reflective (HR) or anti-reflective (AR) coatings. Accordingly, the elements of the imaging optics 3 have AR layers for the pump radiation. The surface 1.1 of the laser crystal 1, on the other hand, is coated in such a way that it is anti-reflective (AR) for the pump radiation and highly-reflective (HR) for the radiation of the laser crystal 1 (fundamental wave). The surface 1.2 of the laser crystal 1 is AR for the fundamental wave of the laser crystal 1 so that it can be supplied to the frequency-doubling crystal 6 without hindrance, but is HR for the pump radiation and also for the frequency-doubled radiation 8. The surfaces 5.1 and 5.2 of the etalon 5 has a reflection factor between 10% and 40% for the radiation of the laser crystal 1 or are not coated. The surface 6.1 of the doubling crystal 6 is HR for the frequency-doubled radiation with crystals which are not wedge-shaped and AR for the radiation of the laser crystal 1. The surface 6.2 of the crystal 6 is HR for the fundamental wave and AR for the frequency-doubled radiation of the doubling crystal 6. The coated surfaces 1.1 and 6.2 enclose the actual laser cavity.

The doubling crystal 6 can also be replaced by an out-coupling element when frequency doubling is not to be carried out. In this case, the cavity is determined by the surface 1.1 of the laser crystal 1 and by a surface of the out-coupling element (not shown) which is now used instead of the doubling crystal 6.

Figure 3:
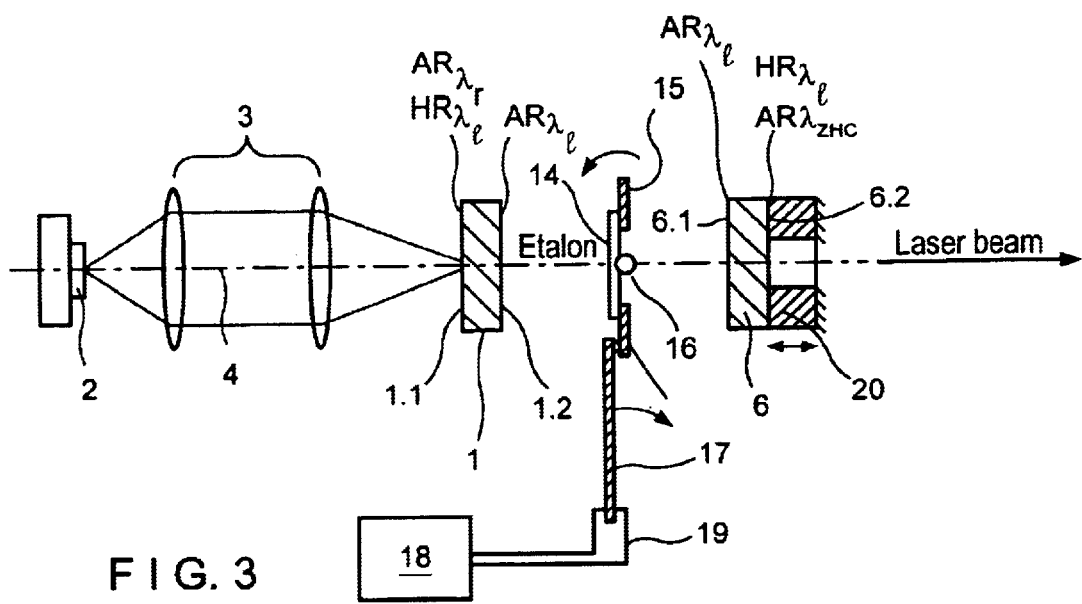
FIG. 3 shows a solid state laser with piezo-actuator for tilting the etalon.

The construction of the DPSSL shown in FIG. 3 comprises, between the laser crystal 1 and the doubling crystal 6, an etalon 14 or another frequency-selective element which is fastened to an annular component 15, e.g., a metal ring. The etalon 14 is swivelable about an axis 16 which is arranged at right angles to the optical axis 4 of the laser. A piezo-actuator 17 which is connected, via the connections 19, with a control device 18 and is controlled by the latter is provided for generating the swiveling or tilting movement of the etalon 14. The piezo-actuator 17 is formed as a bending element in the example, However, a piezo element of a different construction, for example, one which changes in length, can also be provided. It is only important that the swiveling of the etalon 14 can be realized in small angular increments.

The surface 1.1 of the laser crystal 1 is HR for the laser light and AR for the wavelength $\lambda_p$ of the light of the pump diode 2. The surface 1.2 is AR for the wavelength $\lambda_L$ of the light of the laser crystal 1. The surface 6.1 of the doubling crystal 6 is AR for light of wavelength $\lambda_L$, while the surface 6.2 is HR for wavelength $\lambda_L$ and AR for wavelength $\lambda_D$ of the frequency-doubled light.

Also in this embodiment form, the cavity is determined by surfaces 1.1 and 6.2. In order to change or adjust the length of this cavity, another piezo-actuator is provided, for example, wherein the frequency-doubling crystal 6 or an out-coupling mirror (not shown) contacts this additional piezo-actuator 20 as is shown in a simplified manner in FIG. 3. With appropriate control of the piezo-actuator 20, the cavity length can be deliberately changed and adjusted. In this way, the laser can also be correspondingly tuned. The length of the cavity is on the order of several mm, but can also be less than 5 mm.

Figure 4:
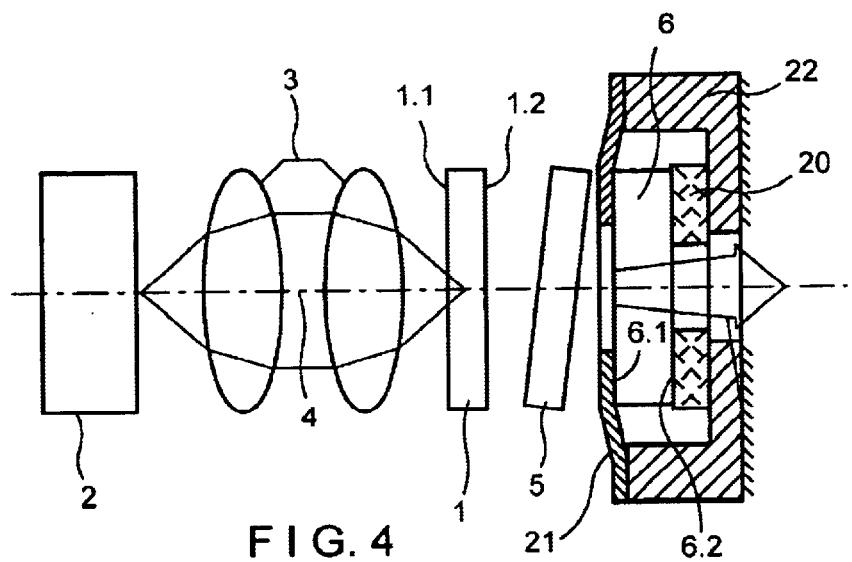
FIG. 4 shows a solid state laser with piezo-actuator and copper ring.

The construction of the laser, according to the invention, shown in FIG. 4 comprises, in addition to the component parts mentioned in connection with FIG. 1, a preferably thin ring 21 which contacts the surface 6.1 of the doubling crystal 6 and which is made of a material with good heat conductivity, e.g., copper, which serves to effectively dissipate heat from the doubling crystal 6. Instead of the doubling crystal 6, an out-coupling mirror can also be arranged if no frequency doubling is provided. In this arrangement, the doubling crystal 6 is likewise connected with one end of the piezo-actuator 20, its other end contacting a mounting 22 or receptacle, for instance. The position of the doubling crystal 6 can also be varied and adjusted in the direction of the optical axis 4 by the piezo-actuator 20.

Figure 5:
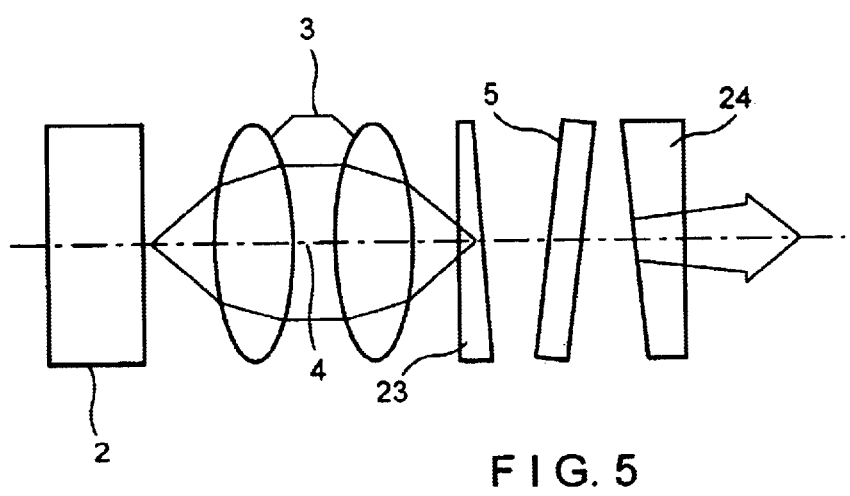
FIG. 5 shows a solid state laser with wedge-shaped crystals and optical elements.

FIG. 5 shows a construction in which a wedge-shaped laser crystal 23 is provided. Further, the doubling crystal 24 is also designed in a wedge-shaped manner. Wedge-shaped crystals serve to prevent parasitic etalons which lead to a reduction in the power of the laser.

In the method for self-calibration of a tunable, diode pumped, solid state laser in which the frequency or the wavelength of the laser radiation of the fundamental and/or doubled frequency is changed by means of changing the optical cavity length by means of a piezo-actuator 17; 20 or a Brewster window via the total amplification bandwidth of the laser-active material of the laser crystal 1, the performance curves during the tuning of an etalon 5; 14 or corresponding optical elements which are arranged in the resonator are recorded and stored. A tuning function for the respective optical element or optical elements is generated or derived from these performance curves by means of a microcontroller or computer 25, and an optimum working point for the optical element or optical elements for maximum suppression of side modes is adjusted by means of a digital or analog regulator with the help of a learning curve (learning characteristic).

The frequency is tuned by changing the cavity length, e.g., by means of the piezo-actuator 20 (FIG. 4), in the single-frequency laser under consideration.

Accordingly, the piezo-actuator 20 can also be modulated initially with a small amplitude and then with increasing amplitude and the power (or efficiency) can be measured. The etalon 5 (FIG. 4) is adjusted in such a way that the power is at a maximum (offset position) and receives a feed forward signal whose control curve is stored after every pass and whose shape is varied.

The etalon 5; 14 can be rotated, e.g., by means of the drive 12 or the piezo-actuator 17, about the rotational shaft 11 extending at right angles or virtually at right angles to the optical axis 4 in order to expand the tuning range of the laser and optimize its output power. This output power can be measured by the measuring element or a photodiode. In this connection, the principal problem which arises is that the movement of the etalon 5; 14 must be adapted exactly to the change in length of the cavity, which is difficult since a root function is used for the linearization of the frequency path or response of the etalon, and hystereses, nonlinearities and long-duration drifts of the individual components that are used are taken into account.

In the DPSSL, the performance curve of the laser is measured, on the one hand, during changes in the angle of rotation 8 of the etalon 5; 14 with a constant length of the cavity and, on the other hand, during changes in the length of the cavity and constant angle of rotation 8, that is, when the etalon 5; 14 is stationary. In the latter case, the frequency changes continuously and, after reaching a power minimum, jumps back by a frequency step range (FSB) of the cavity. The angle of rotation 8 should be less than 10°.

The respective power maximum is approximately in the middle of a frequency step and the transmission maxima of the utilized frequency-selective component are located exactly one above the other. By generating and storing a fit as it is called, conclusions can be drawn about the exact frequency response of a component, including all characteristics of the control components. In this way, by means of an inverse function of these performance curves and a suitable control, preferably a microcomputer or PC, it is possible to adjust all frequency-selective elements in an exactly synchronized manner and accordingly to traverse the maximum possible tuning range in a continuous manner. The fit cure can be generated again automatically at any time; accordingly, the computer "learns" the characteristics of the elements.

It has also proved to be possible to use the efficiency as a criterion rather than the power. With the DPSSL, this is the ratio of the radiated pump output, which increases approximately proportional to the current of the pump diode 2, to the output power of the DPSSL. By means of a regulator, the output power is held to a constant value and the current of the pump diode 2 has a minimum in the center of a frequency step and a maximum at the locations of the frequency jumps. Suitable fit curves are generated in this way.

With a plurality of frequency-selective elements in the cavity, the total transmission of all of these elements is given in a known manner by the product of all transmission functions of all elements. In addition to the adjustable elements such as cavity length and etalon, this also includes the nonadjustable frequency-selective things such as non-ideal coating of the crystals, parasitic etalons, transmission characteristics of the utilized crystals and local influencing of the elements and components by thermal effects. For continuous tuning, it is required that the selectivity of the adjustable elements in the cavity surpasses that of the rest of the elements, wherein it is then possible that the optimal working point is next to a local power minimum.

With reference to the diagrams shown in FIGS. 6 and 7, a small jump resulting from an unfavorable superposition of other frequency-selective elements is detected, for example, when tuning the cavity with the piezo-actuator 20. In this case, an optimal working point for the adjustable elements of the laser can also be found by a microcomputer by means of a learning curve.

As is well-known, longitudinal side modes can come about in a standing wave cavity in single-frequency operation when the frequency-selective elements are not optimally adjusted to one another and the principal mode accordingly suffers losses, so that there remains sufficient residual amplification for a side mode and the latter can start oscillation. The elements are adjusted by the computer in such a way that side modes are suppressed effectively and to a maximum degree. In this connection, every element is located in the middle between two mode jumps.

According to an arrangement of the method, it is also possible to replace the learning characteristic in that the cavity length determining the frequency, as "finest" frequency-selective element of the laser, is tuned gradually first at small amplitudes and then with larger amplitudes. Mode jumps then take place at the edge of the tuning range which are detected and/or recorded by a suitable measurement instrument or via the output of the laser. A suitable measurement instrument of this kind can be, e.g., a Fabry-Perot stabilized on the laser. The movement of the next coarsest frequency-selective element, e.g., of the etalon, is then changed or adapted at the edge of a tuning range until there is no longer a frequency jump in the characteristic line. The entire position (movement) of the coarser frequency-selective element is then stored.

The DPSSL is advantageously a laser whose cavity is in the order of magnitude of about several millimeters or less. In order to tune the laser, the piezo-actuator is provided with a fixed etalon, wherein the selected frequency step range FSB of the etalon is greater than the amplification bandwidth of the laser crystal and the fineness is selected in such a way that a more secure single-frequency operation is ensured with the maximum tuning range.

The etalon can also move in order to achieve a larger tuning range.

The subject matter of the application is not limited only to diode pumped solid state lasers with frequency doubling, but can also be extended to solid state lasers emitting radiation with a multiplication of (n-times) the fundamental frequency, where n is greater than 2. Accordingly, for example, a multiplication of state lasers emitting radiation with a multiplication of (n-times) the fundamental frequency, where n is greater than 2. Accordingly, for example, a multiplication of frequency in which a plurality of suitable, nonlinear crystals are arranged subsequent to the laser crystal can be achieved by an arrangement.

While the foregoing description and drawings represent the present invention, it will be obvious to those skilled in the art that various changes may be made therein without departing from the true spirit and scope of the present.

What is claimed is:

1. A method for the self-calibration of a tunable, diode pumped solid state laser in which the frequency or the wavelength of the laser radiation of the fundamental frequency and/or doubled frequency is changed, the method comprising:

tuning at least one optical element arranged in the cavity to traverse a maximum possible tuning range in a continuous manner by changing the optical cavity length by a piezo-actuator or Brewster window over the total amplification bandwidth of the laser-active material;

recording and storing performance curves of the at least one optical element during the step of tuning, the performances curves indicating the output power of the laser;

generating or deriving a tuning function for the at least one optical element from the performance curves by a microcontroller or computer; and adjusting an optimum working point for the at least one optical element for maximum suppression of side modes by a digital or analog regulator with the help of a learning curve or learning characteristic derived from the performance curves.

2. The method according to claim 1, wherein the optical element is tuned with increasing amplitude for recording the learning curve and there is a correction of the deviation from the optimal position at the edge of the tuning range of another optical element.

3. The method according to claim 1, wherein the adjustment of the optical element is adapted to the change in length of the cavity.

4. The method according to claim 1, wherein for optimizing the optical element, the optical element is itself modulated or another optical element is modulated.

5. The method according to claim 1, wherein by modulating the optical element, a tuning characteristic of the latter or of another optical element is generated, recorded, and stored.

6. The method according to claim 1, wherein frequency-selective elements of the laser are adjusted between two mode jumps by the microcontroller or computer according to the recorded laser characteristic in such a way that side modes are suppressed to a maximum degree.

7. The method according to claim 1:
   wherein the at least one optical element is an etalon; and
   wherein the performance curve of the laser is recorded with a change of the rotational angle δ of the etalon and while maintaining a constant cavity length, and also with a change in the cavity length while keeping the etalon stationary.

8. The method according to claim 1, wherein the learning characteristic is adjusted in that the cavity length and the finest frequency-selective element of the laser determining the frequency is tuned with increasing amplitude, in that the mode jumps occurring at the edge of the tuning range are detected and/or registered by a suitable measuring instrument or via the output of the laser,
   wherein the movement of the next coarsest frequency-selective element at the edge of the tuning range is then changed until a frequency jump in the characteristic no longer occurs, and wherein the entire position movement of the coarser element is then stored.

9. The method of claim 1 wherein:
   the at least one optical element is an etalon.

10. An arrangement for the self-calibration of a tunable, diode pumped solid state laser, wherein the arrangement comprises:
   a laser diode as a pump light source by and in-coupling optics positioned to receive the pump light,
   a laser crystal and out-coupling optics or a nonlinear, frequency-doubling crystal, wherein the outer surfaces of the laser crystal, the out-coupling optics and frequency-doubling crystal have a reflective coating for the laser fundamental frequency and/or for the frequency-doubled radiation and enclose a cavity between then, the laser crystal positioned to receive the numb light through the in-coupling optics;
   an actuator positioned to vary the cavity length for purposes of tuning and calibrating the laser to traverse a maximum possible tuning range in a continuous manner;
   an etalon being provided inside the cavity for changing the tuning range and for determining the output power of the laser, wherein the etalon is rotatable or swivelable about an axis of rotation which extends at right angles to the optical axis of the laser or at an inclination to the latter by a small angle.

11. The arrangement according to claim 10, wherein the etalon is constructed as a transparent disk which is rotatable or swivelable about the axis of rotation and is angularly adjustable by an angular drive.

12. The arrangement according to claim 11, wherein a stepper motor at least one of whose coils is controllable by a controlling circuit, is provided as a drive device.

13. The arrangement according to claim 11, wherein a piezo-actuator in operative connection with the etalon directly or with an intermediary of additional elements is provided as drive device.

14. The arrangement according to claim 11, wherein a piezo-actuator comprises a bending element as a driving element.

15. The arrangement according to claim 11, wherein only one coil of a stepper motor is controlled in the angular drive.

16. The arrangement according to claim 11, wherein both coils of a stepper motor are controlled, and wherein a field vector is modulated to prevent hystereses.

17. The arrangement according to claim 11, wherein a motor is operated in microstep operation.

18. The arrangement according to claim 11, wherein the rotational axis of the etalon is arranged so as to be inclined at an angle δ of less than 100 in relation to a vertical line to the optical axis of the laser.

19. The arrangement according to claim 11, wherein a flexible element with good heat conductivity is provided for cooling a moving element.

20. The arrangement according to claim 11, wherein a element with good heat conductivity is made of copper.

21. The arrangement according to claim 11, wherein wedge-shaped crystals or other wedge-shaped optical elements are provided for preventing formation of parasitic etalons.

22. The arrangement according to claim 11, wherein a standing wave cavity is provided in such a way that a more secure single-frequency operation is achieved by means of suitable matching of the selectivity of the etalon with the suppression of side modes by spatial hole burning achieved by the arrangement and selection of thickness and doping of the laser crystal.

23. The arrangement according to claim 11, wherein the cavity length is less than 5 mm.

24. The arrangement according to claim 11, wherein a piezo-actuator with a stationary etalon is provided for tuning the laser, wherein the frequency step range FSB of the etalon is greater than the amplification bandwidth of the laser crystal and the fineness is selected in such a way that a secure single-frequency operation is ensured in the maximum tuning range.

25. The arrangement according to claim 11, wherein the etalon is moved jointly in order to achieve a larger tuning range.

26. The arrangement according to claim 11, wherein both coils of a stepper motor are controlled, wherein the position of the etalon is modulated.

* * * * *